July 30, 1963 H. L. HENNEKE 3,099,776

INDIUM ANTIMONIDE TRANSISTOR

Filed June 10, 1960

INVENTOR

Harry L. Henneke

BY Stevens, Davis, Miller & Mosher

ATTORNEYS

United States Patent Office 3,099,776

Patented July 30, 1963

3,099,776
INDIUM ANTIMONIDE TRANSISTOR

Harry L. Henneke, Garland, Tex., assignor to Texas Instruments Incorporated, Dallas, Tex., a corporation of Delaware Filed June 10, 1960, Ser. No. 35,311
17 Claims. (Cl. 317—237)

Figures 1, 2, 3, 4, 5, 6, 7, 8:
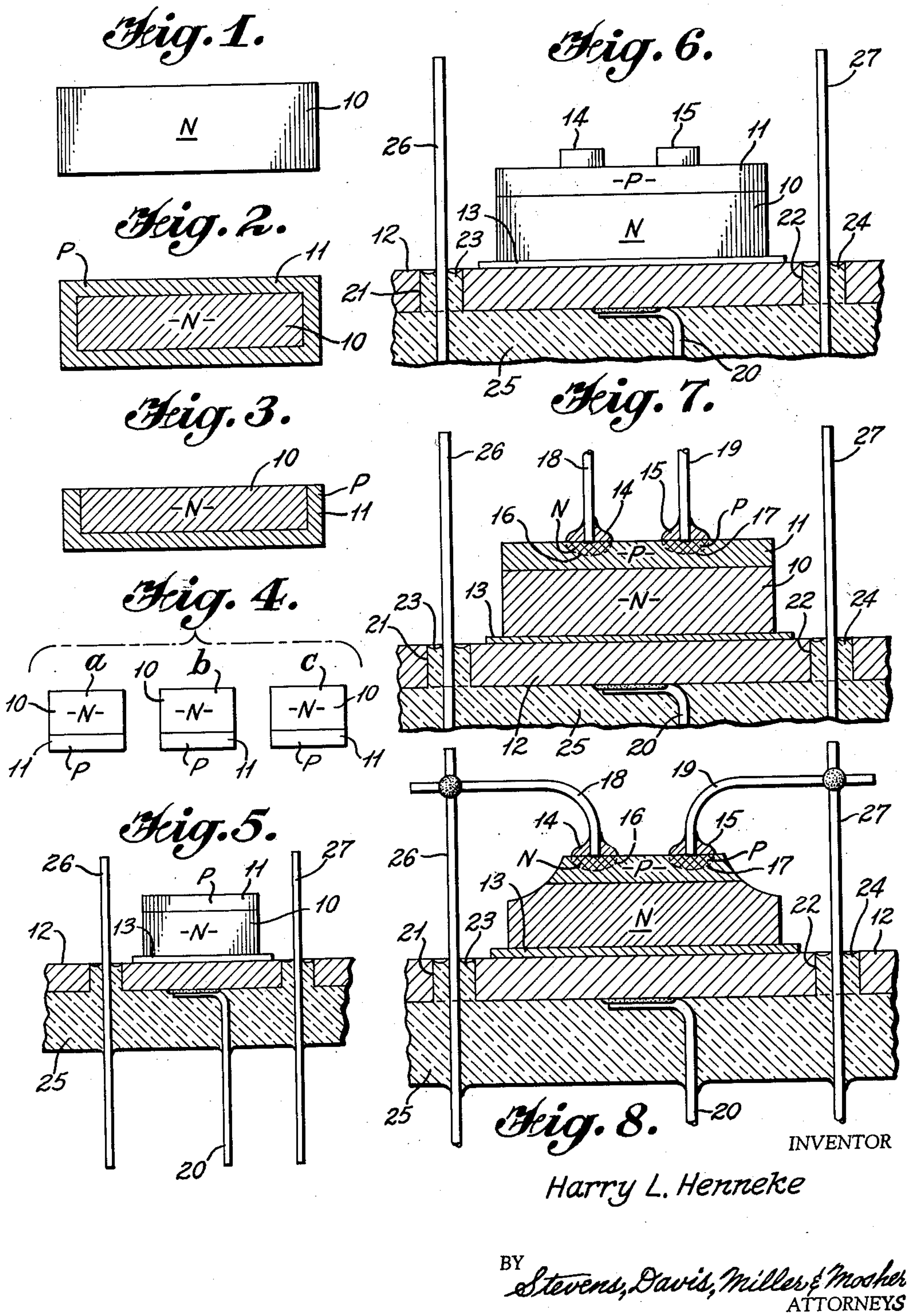

The present invention relates to indium antimonide transistors and, more particularly, relates to the fabrication of a diffused-base, alloyed-emitter indium antimonide NPN transistor which is capable of operating at higher frequencies and with less noise than present transistors.

The electronic industry is continually searching for semiconductor devices capable of providing improved performance. One objective to which considerable work has been devoted is that of producing semiconductor devices capable of operating at higher frequencies. This is important because, in addition to other advantages that accompany high frequency characteristics, the higher the frequency, the shorter the time required to switch the device. Much work also has centered around the development of semiconductor devices which operate at low temperatures. The great interest in low temperature operation results from the fact that low temperature devices are characterized by low noise, and the lower the noise, the greater the fidelity of reproduction.

A recent development in the semiconductor field has been the introduction of indium antimonide as a semiconductor material for many different types of devices, e.g., diodes, photodetectors, infrared detectors, magnetoresistors, etc. A primary advantage of indium antimonide over silicon or germanium lies in the much higher electron mobility available in indium antimonide. For example, indium antimonide has an electron mobility greater than 100,000 $cm.^2$ per volt-second, while germanium has an electron mobility of only around 3600 $cm.^2$ per volt-second and silicon an electron mobility of about 1200 $cm.^2$ per volt-second. This higher electron mobility in indium antimonide allows semiconductor devices to be made which can operate at much higher frequencies than when silicon or germanium is used as the semiconductor material. Moreover, an indium antimonide semi-conductor device is able to operate at a temperature of around minus 196° C.; thus, low noise advantages accrue.

Previous attempts to make a successful transistor from indium antimonide have failed for several reasons. For example, it is quite difficult to diffuse a P-type layer of proper impurity content into N-type indium antimonide. Moreover, an alloy with an impurity content sufficiently high to make a rectifying alloyed junction on low resistivity P-type material is somewhat difficult to make, and due to the segregation characteristics of the impurities, it is very difficult to obtain suitable regrowth regions. The techniques of the present invention, however, overcome these problems and result in the production of an improved indium antimonide transistor.

It is, therefore, a principal object of the present invention to provide an improved indium antimonide transistor which can operate at higher frequencies than is possible with prior art transistors. Cut-off frequencies higher than 100 mc. have been achieved, and it is expected that frequencies above 1000 mc. can be realized with an indium antimonide transistor produced in accordance with the principles of the present invention.

It is a further object of the present invention to provide an indium antimonide transistor which can operate at temperatures at least as low as minus 196° C. to afford less noise than is possible with existing transistors.

It is a still further object of the present invention to provide an indium antimonide transistor having a broad-band gap emitter structure so that improved transistor performance characteristics will result. This improved performance is brought about in the following way. It is necessary that the ratio of the injected minority carrier current to the total emitter current be near unity in order to achieve a large current amplification factor. Kroemer ("Theory of a Wide-Gap Emitter for Transistors," Proc. IRE, November 1957), has developed the theory which shows that this ratio, or emitter efficiency, can be enhanced if the emitter has a larger band gap than the base region. This effect may be utilized to extend the transistor's frequency range and to reduce the alpha fall-off with current.

Other and further objects, advantages and characteristic features of the present invention will become readily apparent from the following detailed description of a preferred embodiment of the invention when taken in conjunction with the appended drawings in which:

FIGURES 1–8 illustrate the respective steps in fabricating the indium antimonide transistor according to the method of the present invention, the completed transistor being illustrated in FIGURE 8.

Referring now to the drawings, FIGURE 1 shows a wafer 10 of N-type indium antimonide which is used to produce a batch of transistors according to the technique of the present invention. The wafer has been cut from a single crystal of indium antimonide and has been lapped to a thickness of between 0.005″ and 0.025″. The size of the wafer is not critical; it simply determines the number of units which can be made from one wafer. Typically, the wafer might be 0.5″ square. The indium antimonide preferably has a resistivity of between 0.02 and 0.2 ohm-cm., and in a preferred embodiment the resistivity is 0.05 ohm-cm. The wafer 10 is cleaned ultrasonically, after which it is etched with an etchant composed of a saturated solution of tartaric acid and nitric acid in the proportions of about 3 to 1. These proportions are not critical.

The wafer 10 is then vapor diffused with a P-type impurity-producing material, such as zinc, cadmium, mercury, manganese, magnesium, or copper (either in the elemental form or in a diluted form in a neutral solvent metal such as indium) to produce a P-type layer in the indium antimonide about 10 to 20 microns deep with a surface concentration of from about $10^{15}$–$10^{19}$ carriers per $cm.^2$. In a preferred embodiment of the invention the diffusant consists of zinc in an indium or indium antimonide alloy, and the diffusion operation is carried out by heating the wafer 10 to a temperature of essentially between 300–500° C. (preferably around 400° C.) for a period of about two hours. The diffusion period may be as short as 12 minutes or as long as 24 hours. The result of the diffusion operation is indicated in FIGURE 2, where the wafer 10 is shown to have a diffused P-type layer 11 about the wafer surface.

After diffusion, the wafer is lapped on one side to remove the P-type diffused layer 11. This is shown in FIGURE 3. The wafer is then diced into smaller wafers which will form the resultant individual transistors. The size of these smaller wafers is preferably 0.040″ x 0.040″ x 0.005″. In FIGURE 4, three such wafers *a*, *b*, and *c* are illustrated; however, in the actual practice of the method a single large wafer 10 will produce over one hundred individual transistor wafers. Although the following discussion, which deals with the remaining steps in the method for fabricating the indium antimonide transistor, is specifically concerned with one of the diced wafers *a*, *b*, and *c* of FIGURE 4, it should be understood that fabrication of all individual transistor units will be identical to the one described.

A transistor header 12 of gold plated Kovar or other metals capable of making hermetic glass to metal seals is tinned with a pure tin solder or other suitable solder material to form a layer 13 on the upper surface of the header where the transistor is to reside. As is shown in FIGURE 5, a transistor wafer *a*, *b*, or *c* (FIGURE 4) is placed on the tinned surface 13 of the header 12 with the N-type layer 10 resting on the tin layer 13 and the P-type layer 11 up. The assembly is then placed in a furnace which is heated to a temperature of around 350° C. to cause the wafer to become soldered to the header and form a large area collector contact. After the wafer has become firmly attached to the header, the furnace is allowed to cool.

Next, the emitter junction and the base contact for the transistor are formed. In the completed transistor, the N-type layer 10 serves as the collector and the P-type layer 11 serves as the base. An emitter pellet of an alloy composed of an N-type producing impurity alloyed with indium and gallium is used to produce the emitter juction and emitter contact. Elements suitable for use as the N-type producing impurity are tellurium, sulfur, and selenium. In a preferred embodiment of the present invention, however, tellurium is employed. The percentages of the various materials which may be used in forming the emitter pellet are from about 0.4% to 4% gallium, 0.4% to 4% tellurium and the remainder indium. A preferred composition consists of 2.7% gallium, 2.3% tellurium, and 95% indium. Gallium has been found to be a necessary ingredient, and its inclusion in the alloy allows for a broader band gap in the emitter, and changes the segregation coefficient of the tellurium.

In preparing the emitter pellets, the three materials are carefully weighed, after which they are placed in a quartz tube which is evacuated to a pressure of less than 5 microns of mercury. The temperature in the quartz tube is raised to around 1000° C. to melt the materials, after which the temperature is quickly lowered to allow the materials to solidify and alloy together. The alloy is removed from the quartz tube and rolled to form a thin paper-like layer, which is sliced into tiny contact dots suitable for application to the indium antimonide wafer 10.

The pellet used to form the base contact consists of an alloy of indium and a P-type impurity-producing material and is formed by a procedure similar to that used to form the emitter pellets. Elements for the use as the P-type impurity are zinc, cadmium, or mercury. In a preferred embodiment, however, the alloy contains from about 0.2% to 2.0% cadmium with the remainder indium.

The indium-gallium-tellurium emitter pellet, designated by the numeral 14 in FIGURE 6, is placed on the upper surface of the P-type layer 11 of wafer 10, and the indium-cadmium base pellet, designated by the numeral 15, is also placed on top of the P-type layer 11. The pellets 14 and 15 preferably have a diameter of no greater than 5 mils and are placed on the layer 11 no farther than 5 mils apart.

The wafer 10 with the emitter and base pellets 14 and 15 located thereon is then heated to a temperature of essentially between 180° C. and 400° C. (preferably about 220° C.) so that the pellets 14 and 15 will actually alloy into the P-type layer 11. The alloyed emitter region 16, which forms a rectifying contact with the P-type base layer 11, and the alloyed base contact region 17, which forms an ohmic connection with the base layer 11, are illustrated in FIGURE 7. The wafer is cooled to a temperature of around 170° C., and gold wires 18 and 19 are pushed into the molten pellets 14 and 15, respectively. The gold wire 18 serves as the emitter lead, and the gold wire 19 serves as the base lead, the tinned upper surface 13 of the header 12 serving as the collector connection.

The finished transistor configuration is illustrated in FIGURE 8. The emitter and base lead wires 18 and 19 are bent and soldered or welded to the header leads 26 and 27 which pass through holes 21 and 22, respectively, in the header 12. These header leads are sealed therein by means of glass seals 23 and 24 which securely attach the leads 26 and 27 to the header 12 and, at the same time, electrically insulate the base and emitter from the header. A lead 20 is soldered to the lower surface of the header 12 to furnish the collector connection for the transistor. These header leads are also gold plated Kovar. The header 12 is mounted on and sealed to a leyer of glass 25 which forms part of the envelope for the transistor, with the emitter, base and collector header leads 26, 27, and 20, respectively, projecting out of the glass layer 25 for attachment to desired external connectors.

The surface area surrounding and including the pellets 14 and 15, as well as all other exposed parts of the unit except the sides and the remaining part of the top of wafer 10, are then masked by using polystyrene or other suitable material, and the unit is etched in a tartaric-nitric acid etchant for a period of around 30 seconds to 5 minutes to remove all the exposed portion of layer 11 and to form the mesa structure of FIGURE 8. Extreme care is not necessary in masking the header itself since the gold plating is resistant to the action of the etch. The purpose of this step is to reduce the base-collector junction area and thus improve high frequency performance. The etch also serves to clean the exposed portion of the base-collector junction. The mask is then removed by a suitable solvent, such as carbon tetrachloride, after which the transistor unit is then immersed briefly in a cleaning solution, such as that disclosed in U.S. Patent No. 2,902,419, followed by a thorough washing in deionized water. After removal from the washing solution, the transistor unit is dried, a can is affixed to enclose and protect the transistor, and it is stored until called upon for use.

It should be noted that by using the procedure set forth above, an indium antimonide transistor is produced having a wide N-type collector region 10, a thin base layer 11 diffused into the N-type layer, and an emitter dot 14 alloyed with the base layer to form the emitter region 16. Emitter, base, and collector leads 26, 27, and 20, respectively, are conveniently mounted in the header 12. The resultant transistor is able to operate at lower temperatures than present transistors and also can be used at higher frequencies than present transistors.

Although the invention has been shown and described with reference to a particular embodiment, nevertheless, various changes and modifications obvious to those skilled in the art are deemed to be within the purview of the invention.

What is claimed is:

1. A method for making a transistor comprising diffusing a P-type conductivity-producing impurity into a wafer of N-type indium antimonide to produce a P-type region in said wafer, and alloying an N-type conductivity-producing impurity with a portion of said P-type region.

2. A method for making a transistor comprising diffusing a P-type conductivity-producing impurity into a wafer of N-type indium antimonide to produce a P-type region in said wafer, and alloying an alloy of indium, gallium and an N-type conductivity-producing impurity with a portion of said P-type region.

3. A method according to claim 2 wherein said N-type conductivity-producing impurity is selected from the group consisting of selenium, tellurium and sulfur.

4. A method for making a transistor comprising diffusing a P-type conductivity-producing impurity into a wafer of N-type indium antimonide to produce a P-type region in said wafer, and alloying an alloy comprising essentially between 0.4% and 4% gallium, 0.4% and 4% tellurium, and the rest indium with a portion of said P-type region.

5. A method for making a transistor comprising diffusing a P-type conductivity-producing impurity into a wafer of N-type indium antimonide to produce a P-type region in said wafer, alloying an alloy of indium, gallium and an N-type conductivity-producing impurity with a portion of said P-type region and an alloy of indium and a P-type conductivity-producing impurity with another portion of said P-type region.

6. A method according to claim 5 wherein the second-mentioned P-type conductivity-producing impurity is selected from the group consisting of zinc, cadmium and mercury.

7. A method for making a transistor comprising diffusing a P-type conductivity-producing impurity into a wafer of N-type indium antimonide to produce a P-type region in said wafer, and alloying an alloy comprising essentially between 0.4% and 4% gallium, 0.4% and 4% tellurium, and the rest indium with a portion of said P-type region and an alloy comprising essentially between 0.2% and 2% cadmium and the rest indium with another portion of said P-type region.

8. A method for making a transistor comprising diffusing a P-type conductivity-producing impurity into a wafer of N-type indium antimonide to produce a P-type region in said wafer, alloying a pellet of indium, gallium and an N-type conductivity-producing impurity with a portion of said P-type region and a pellet of indium and a P-type conductivity-producing impurity with another portion of said P-type region, and attaching a gold wire to each of said pellets.

9. A method for making a transistor comprising diffusing a P-type conductivity-producing impurity into a wafer of N-type indium antimonide to produce a P-type region along the surfaces of said wafer, removing the P-type material from one surface of said wafer, dicing said wafer into a plurality of smaller wafers, soldering each of said smaller wafers to a header with the N-type region of said smaller wafer being adjacent said header thereby to form a plurality of assemblies, placing a pellet of an alloy of indium, gallium and tellurium adjacent a portion of the P-type region of each of said smaller wafers and placing a pellet of an alloy of indium and cadmium adjacent another portion of the P-type region of each of said smaller wafers, heating the assemblies to cause the said pellets to alloy to the P-type regions, cooling said assemblies slightly, attaching a gold wire to each of said pellets while molten, solidifying said pellets, and etching away portions of each of said smaller wafers to form mesa configurations.

10. A method according to claim 9 wherein the diffusion of said P-type conductivity-producing impurity into said N-type wafer is carried out at a temperature of essentially between 300–500° C. for a time of about two hours.

11. A method according to claim 9 wherein said smaller wafer and said pellets are heated to a temperature of from about 180° C. to about 400° C. during the step of alloying said pellets to said P-type regions.

12. A method according to claim 9, wherein said N-type indium antimonide has a resistivity of essentially between 0.02 and 0.2 ohm-cm. and wherein the diffused P-type region has a surface concentration of around $10^{15}$ to $10^{19}$ carriers per $cm.^2$.

13. A transistor comprising a single crystal of indium antimonide including a region of N-type indium antimonide, a diffused region of P-type indium antimonide contiguous with said N-type region and forming a P-N junction with said N-type region, and a pellet of N-type conductivity alloyed wtih a portion of said P-type region to form a rectifying junction with said P-type region spaced from said P-N junction.

14. A transistor according to claim 13 wherein said N-type region is the collector, said P-type region is the base, and said pellet of N-type conductivity is the emitter.

15. A transistor comprising a single crystal of indium antimonide including a collector region of N-type indium antimonide, a relatively narrow base region of P-type conductivity diffused into said N-type region, an emitter consisting of an alloy of indium, gallium and an element selected from the group consisting of sulfur, selenium, and tellurium alloyed with a portion of said P-type base region, and a base contact consisting of an alloy of indium and an element selected from the group consisting of zinc, cadmium, and mercury alloyed with said P-type base region.

16. A transistor comprising a single crystal of indium antimonide including a collector region of N-type indium antimonide, a relatively narrow base region of P-type conductivity diffused into said N-type region, an emitter pellet consisting of an alloy of indium, gallium and an element selected from the group consisting of sulfur, selenium, and tellurium alloyed with a portion of said P-type base region, a base connection pellet consisting of an alloy of indium and an element selected from the group consisting of zinc, cadmium, and mercury alloyed with said P-type base region, a first gold wire connected to said emitter pellet, a second gold wire connected to said base pellet, and a lead connected to said collector region.

17. A transistor comprising a single crystal of indium antimonide including a collector region of N-type indium antimonide, a relatively narrow base region of P-type conductivity diffused into said N-type region, an emitter pellet consisting of an alloy of indium, gallium and an element selected from the group consisting of sulfur, selenium and tellurium alloyed with a portion of said P-type base region, a base contact pellet consisting of an alloy of indium and an element selected from the group consisting of zinc, cadmium, and mercury alloyed with said P-type base region, a first gold wire connected to said emitter pellet, a second gold wire connected to said base pellet, a lead connected to said collector region, a header having a pair of insulated leads, the N-type collector region being soldered to a portion of said header, and said gold wires being attached to the leads of said header.

References Cited in the file of this patent

UNITED STATES PATENTS

| | | |
|---|---|---|
| 2,796,563 | Ebers et al. | June 18, 1957 |
| 2,798,989 | Welker | July 9, 1957 |
| 2,829,422 | Fuller | Apr. 8, 1958 |
| 2,842,723 | Koch et al. | July 8, 1958 |
| 2,842,831 | Pfann | July 15, 1958 |
| 2,847,335 | Gremmelmaier et al. | Aug. 12, 1958 |
| 2,849,664 | Beale | Aug. 26, 1958 |
| 2,979,428 | Jenny et al. | Apr. 11, 1961 |